US007764409B2

(12) United States Patent
Tsuchiya

(10) Patent No.: US 7,764,409 B2
(45) Date of Patent: Jul. 27, 2010

(54) MANUSCRIPT CONVEYER GUIDE USED FOR A MANUSCRIPT READER UNIT

(76) Inventor: Hiroaki Tsuchiya, c/o Kyocera Mita Corporation, 2-28, Tamatsukuri , 1-chome, Chuo-ku, Osaka 540-8585 (JP)

( * ) Notice: Subject to any disclaimer, the term of this patent is extended or adjusted under 35 U.S.C. 154(b) by 221 days.

(21) Appl. No.: 12/074,368

(22) Filed: Mar. 4, 2008

(65) Prior Publication Data

US 2008/0259412 A1 Oct. 23, 2008

Related U.S. Application Data

(60) Continuation of application No. 11/651,518, filed on Jan. 10, 2007, now Pat. No. 7,408,686, which is a division of application No. 10/831,122, filed on Apr. 26, 2004, now Pat. No. 7,403,314.

(30) Foreign Application Priority Data

Apr. 28, 2003 (JP) ............................ 2003-123432

(51) Int. Cl.
*H04N 1/04* (2006.01)

(52) U.S. Cl. ...................................... 358/498; 358/496

(58) Field of Classification Search ................. 358/498, 358/496, 474, 505, 296; 399/367, 397, 405; 271/3.14, 8.1, 3.2

See application file for complete search history.

(56) References Cited

U.S. PATENT DOCUMENTS

| | | | | |
|---|---|---|---|---|
| 7,251,063 | B2 * | 7/2007 | Mui et al. | 358/498 |
| 7,385,735 | B2 * | 6/2008 | Makino et al. | 358/496 |
| 7,518,763 | B2 * | 4/2009 | Shiraishi et al. | 358/475 |
| 2007/0145662 | A1 * | 6/2007 | Yamada | 271/3.2 |
| 2009/0051106 | A1 * | 2/2009 | Hayano | 271/253 |

FOREIGN PATENT DOCUMENTS

| | | | |
|---|---|---|---|
| JP | 2000295430 A | * | 10/2000 |
| JP | 2001066713 A | * | 3/2001 |

* cited by examiner

*Primary Examiner*—Cheukfan Lee
(74) *Attorney, Agent, or Firm*—H. Jay Spiegel

(57) ABSTRACT

A manuscript conveyer guide which has a curved surface and a flat surface in a facing portion to an upper surface of the contact glass plate, the curved surface being positioned on the upstream in the manuscript conveying direction, the flat surface being positioned on the downstream in the manuscript conveying direction, and the distance $d_2$ between the flat surface and the contact glass being greater than the distance $d_1$ between the curved surface and the contact glass. The manuscript conveyor guide is arranged over the contact glass plate and guides the manuscript that has passed over the contact glass plate in a direction of discharge.

4 Claims, 4 Drawing Sheets

MANUSCRIPT CONVEYER GUIDE USED FOR A MANUSCRIPT READER UNIT

CROSS REFERENCE TO RELATED APPLICATIONS

This is a continuation of application Ser. No. 11/651,518, filed Jan. 10, 2007, now U.S. Pat. No. 7,408,686, issued Aug. 5, 2008, which is a divisional of application Ser. No. 10/831,122, filed Apr. 26, 2004 now U.S. Pat. No. 7,403,314.

BACKGROUND OF THE INVENTION

1. Field of the Invention

The present invention relates to a manuscript conveyer guide used for a manuscript reader unit in image-forming machines such as a copier, a facsimile, a printer and a scanner. More specifically, the invention relates to a member used as a guide for conveying a manuscript, that is placed adjacent to a contact glass plate and for guiding the manuscript discharged from the contact glass plate at the time when the manuscript moving on the contact glass plate is read out by using an optical system arranged under the contact glass plate.

2. Description of the Related Art

In the image-forming apparatus based on the electrophotographic method, the surface of the photosensitive material is uniformly charged to a predetermined polarity, an electrostatic image is formed by being exposed to image-bearing light irradiated based upon predetermined manuscript data, a toner image is formed by developing the electric charge image, and the toner image is transferred onto a predetermined paper and is fixed thereon to thereby form the image. In this image-forming apparatus, the manuscript data are obtained by irradiating the manuscript with light and by reading the reflected light by a CCD element. This holds in the image reader unit such as a scanner, too.

In the apparatus that reads image as described above, it is a widely accepted practice to read the manuscript image by automatically feeding the manuscript and irradiating the manuscript passing on the contact plate with light. Most of the facsimiles and copiers for business use are provided with the above reader mechanism. When the manuscript image of the manuscript passing on the contact glass plate are to be read out as described above, a manuscript conveyer guide is usually provided neighboring the contact glass on the side of discharging the manuscript (see, for example, Japanese Unexamined Patent Publication (Kokai) No. 9-37023).

In the above conveyer guide, the upper surface is an inclined guide surface, the manuscript that has passed on the contact glass plate is fed upward along the guide surface and is discharged onto a predetermined manuscript tray.

When the conveyer guide (hereinafter often referred to as downstream conveyer guide) is provided neighboring the contact glass plate on the manuscript discharge side, however, there arouses a problem in that the manuscript is not evenly read out. This tendency becomes conspicuous particularly when the guide surface of the downstream conveyer guide is steeply inclined relative to the contact glass surface (horizontal surface) or when the manuscript is conveyed at an increased speed on the contact glass. From the standpoint of realizing the apparatus in a small size, it is desired that the guide surface of the downstream conveyer guide is an inclined surface that is steeply inclined. From the standpoint of increasing the reading speed, further, it is desired to improve the uneven reading of the manuscript since the manuscript is conveyed at a high speed.

SUMMARY OF THE INVENTION

It is therefore an object of the present invention to provide a manuscript conveyer guide which is disposed neighboring the contact glass plate on the manuscript discharge side and effectively suppresses the unevenness in the reading of the manuscript.

According to the present invention, there is provided a manuscript conveyer guide provided in an image-reading unit that reads an image of the manuscript moving on a contact glass plate by using an optical system arranged under the contact glass plate, the manuscript conveyer guide being arranged neighboring the contact glass plate on a manuscript discharge side and guiding the manuscript that has passed over the contact glass plate in a direction of discharge, wherein:

an upper surface of said manuscript conveyer guide includes a narrow partial guide surface extending from an end thereof on the side of the contact glass in a direction to separate away from the contact glass, which is in a direction in which the manuscript is discharged, and non-guide surfaces continuous to said partial guide surface; and said partial guide surface is forming an inclined surface which is low at an end thereof on the side of the contact glass and becomes high as it goes away from the contact glass, and said inclined surface is relatively higher than the non-guide surfaces, permitting the manuscript discharged from the contact glass plate to come into contact with said partial guide surface and, further, permitting the manuscript to be guided upward along said partial guide surface.

In the present invention, an end of the manuscript discharged from the contact glass plate is, first, introduced onto a partial guide surface on the upper surface of the manuscript conveyer guide. That is, the end of the manuscript partly comes in contact with the guide surface of the partial guide surface and is guided upward along the partial guide surface. Namely, the whole end of the manuscript does not come in contact at one time with the manuscript conveyer guide. Therefore, the shock is small when the end of the manuscript comes in contact therewith, effectively suppressing the occurrence of unevenness in the reading of the manuscript. That is, in the conventional manuscript conveyer guide, the upper surface as a whole works as a guide surface, and the whole end of the manuscript discharged from the contact glass comes in contact with the guide surface at one time. As a result, the shock is great when the end of the manuscript comes in contact with the guide surface. When the end of the manuscript comes in contact with the guide surface, therefore, the speed of the manuscript passing on the contact glass becomes uneven causing unevenness in the reading operation. The present invention effectively suppresses the unevenness in the reading caused by the shocks.

DETAILED DESCRIPTION OF THE INVENTION

Figure 1:
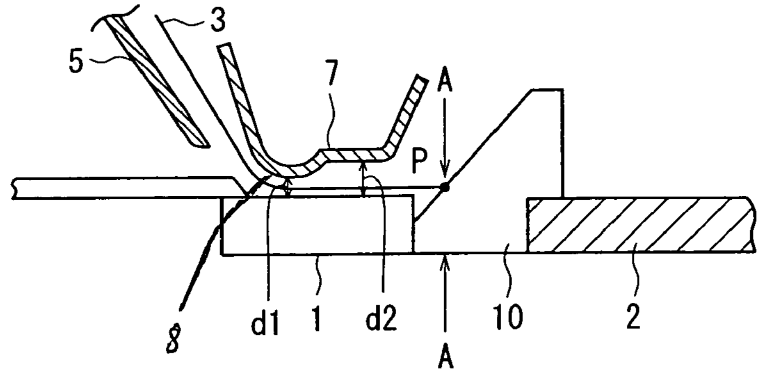
FIG. 1 is a side sectional view schematically illustrating the arrangement of a manuscript conveyer guide according to the present invention.

FIG. 1 is a side sectional view schematically illustrating the arrangement of a manuscript conveyer guide according to the present invention. In FIG. 1, a contact glass 1 is mounted on a machine frame 2 on the upper surface of a predetermined image-forming apparatus, and a manuscript 3 that is to be read out for its images passes on the upper surface of the contact glass 1. That is, though not illustrated, an optical unit comprising a source of light, a CCD element and an optical lens is arranged on the lower side of the contact glass 1, and the manuscript passing on the contact glass 1 is irradiated with light to read the image of the manuscript.

Namely, an upstream conveyer guide 5 is arranged over the contact glass 1 on the upstream side relative to the direction in which the manuscript 3 is conveyed, an upper guide 7 is arranged over the contact glass 1 maintaining a suitable distance, the manuscript plated on a predetermined manuscript plate (not shown) is conveyed from the guide 5 onto the contact glass 1 via a paper feed roller or the like by a conventional method, and, due to the upper guide 7, the manuscript 3 passes on the contact glass 1 while coming in contact with the upper surface of the contact glass 1. The operation for reading the image is continuously carried out while the manuscript 3 passes on the contact glass 1. The upper guide has a curved surface 8 that guides the manuscript 3 downwardly toward the upper surface of the contact glass plate 1.

On the downstream of the contact glass 1 in a direction in which the manuscript is conveyed, a manuscript conveyer guide 10 of the present invention is secured to the machine frame 2 neighboring the contact glass 1. Namely, the manuscript 3 that has passed on the contact glass 1 is discharged upward along the manuscript conveyer guide 10, and is fed, for example, onto the manuscript discharge tray.

In the present invention, as will be understood from FIG. 1, the upper surface of the manuscript conveyer guide 10 on the side of the contact glass 1 is positioned lower than the upper surface of the contact glass 1, and an end on the other side thereof is positioned considerably higher than the upper surface of the contact glass 1 and, hence, the manuscript conveyer guide 10 is considerably steeply inclined as a whole. In its optimum state, the upper surface of the manuscript conveyer guide 10 at the end on the side of the contact glass 1 should be in flush with the upper surface of the contact glass 1. However, if the upper surface of the manuscript conveyer guide 10 becomes higher than the upper surface of the contact glass 1 even by a small amount, then, the manuscript 3 tends to be caught. To reliably prevent the probability of being caught, therefore, the upper surface of the manuscript conveyer guide 10 on the side of the contact glass 1 is positioned to be lower as a whole than the upper surface of the contact glass 1. Therefore, the end of the manuscript 3 that has passed on the contact glass 1 comes in contact with an intermediate portion (contacting point is denoted by P) on the upper surface of the manuscript conveyer guide 10, and is guided upward.

Referring to FIG. 1, the upper guide 7 provided over the contact glass 1 has such a shape that a distance $d_2$ to the contact glass 1 on the downstream in the direction in which the manuscript 3 is conveyed is greater than the distance $d_1$ to the contact glass 1 on the upstream. That is, the end of the manuscript 3 that is conveyed deflects as it abuts the upper surface of the manuscript conveyer guide 10. By setting a large distance $d_2$ as described above, however, the deflected portion is prevented from rubbing the upper guide 7.

The manuscript conveyer guide 10 of the present invention has an important feature in that a partial guide surface is formed on the upper surface, and a point P to where the end of the manuscript 3 comes in contact is positioned on the partial guide surface.

Figure 2A:
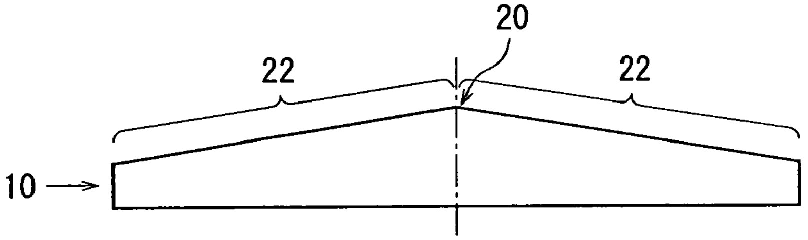
FIGS. 2*a* to 2*c* are transverse sectional views of the manuscript conveyer guide along the line A-A in FIG. 1.
Figure 2B:
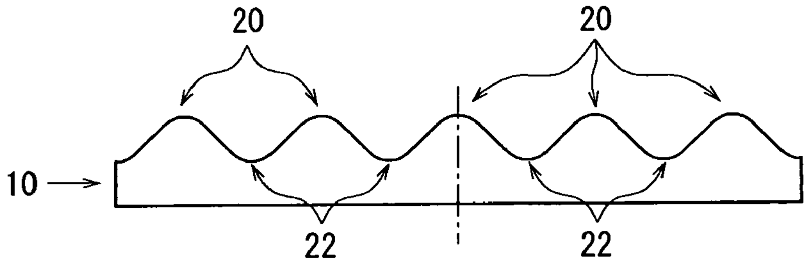
Figure 2C:
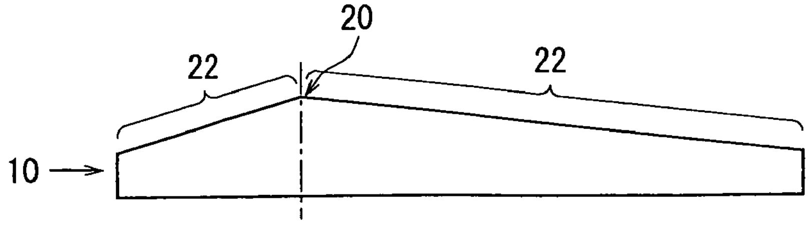

FIGS. 2*a* to 2*c* are views for illustrating the above partial guide surfaces, i.e., various transverse sectional views (transverse sectional views along A-A of the guide 10 of FIG. 1) of the manuscript conveyer guide 10 in the portion including the above contact point P. In FIGS. 2*a* to 2*c*, the partial guide surface is denoted by 20. That is, the partial guide surface 20 is formed in a portion of the manuscript conveyer guide 10 in the direction of width, and forms a narrow inclined surface having an end which is low on the side of the contact glass 1 and is becoming higher as it goes away from the contact glass 1 (see FIG. 1) and having relatively higher surfaces than other surfaces (non-guide surfaces) 22 (see FIGS. 2*a* to 2*c*). As will be understood from the foregoing, a portion in the direction of width is forming a narrow guide surface 20 (the guide surface is not over the whole width), and the manuscript 3 introduced onto the upper surface of the guide 10 comes partly into contact with the partial guide surface 20 and is guided upward. In other words, the contact point P existing on the partial guide surface to where the end of the manuscript 3 comes in contact, means that the end of the manuscript 3 does not come into contact with the upper surface of the guide 10 over the whole width thereof but comes into contact with the partial guide surface 20 over only a portion of the end in the direction of width. As compared to when the end of the manuscript 3 comes in contact with the upper surface of the guide 10 over the whole width thereof, therefore, the shock at the time of contact is greatly decreased to effectively decrease unevenness in the manuscript conveying speed caused by shocks and it is made possible to effectively avoid unevenness in the reading caused by shocks.

The partial guide surface 20 may be formed in a variety of ways. In FIG. 2*a*, for example, the partial guide surface 20 is formed in the central portion in the direction of width, and both side portions are non-guide surfaces 22 that do not come in contact with the manuscript 3. In FIG. 2*b*, a plurality of guide surfaces 20 are discretely formed in the direction of width maintaining a predetermined distance, and the upper surface of the guide 10 as a whole is rugged. That is, in the example of FIG. 2*b*, the apexes of the protruded surfaces serve as partial guide surfaces 20 and recessed surfaces among them are non-guide surfaces 22. To prevent the manuscript 3 from being sent aslant, it is usually desired that the partial guide surfaces 20 are symmetrically formed relative to the centers in the direction of width. In an apparatus of the type in which manuscripts of small sizes are conveyed being brought to one side (e.g., back side) in the direction of width of the conveyer guide 10, further, it is desired that the partial guide surface 20 is provided at a position deviated toward an end on one side as illustrated in FIG. 2*c* (left side in FIG. 2*c*).

In the present invention, the end of the manuscript 3 partly comes in contact with the partial guide surface 20 and is guided upwards. The partial guide surface 20 is extending upward from the lower end of the upper surface of the conveyer guide 10 (end on the side of the contact glass 1). The point P to where the manuscript 3 comes in contact may vary to a considerable degree depending upon the state of the end of the manuscript and the speed of feeding the manuscript. Therefore, the point P to where the end of the manuscript 3 is brought into contact is set to be located at the partial guide surface 20 at all times.

Further, so far as the above partial guide surface 20 is formed, there is no particular limitation on the shape of the upper surface of the manuscript conveyer guide 10. For example, the non-guide surface 22 may be so formed as to become in flush with the partial guide surface 20 as it goes upward (i.e., the entire guide surface is formed toward the upper side), or the guide surface 20 and the non-guide surface 22 may be so formed as to maintain a predetermined difference in height at all times.

Figure 3:
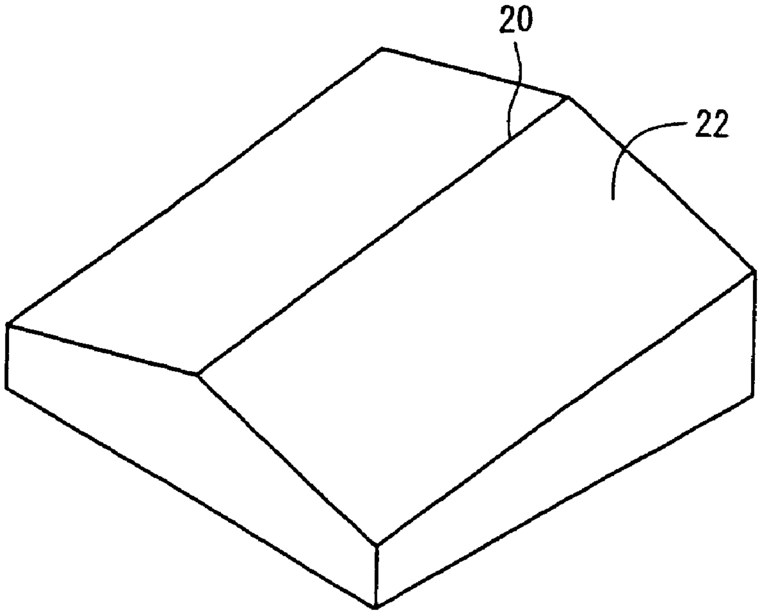
FIGS. 3 to 8 are perspective views illustrating the manuscript conveyer guides of various kinds according to the present invention.
Figure 4:
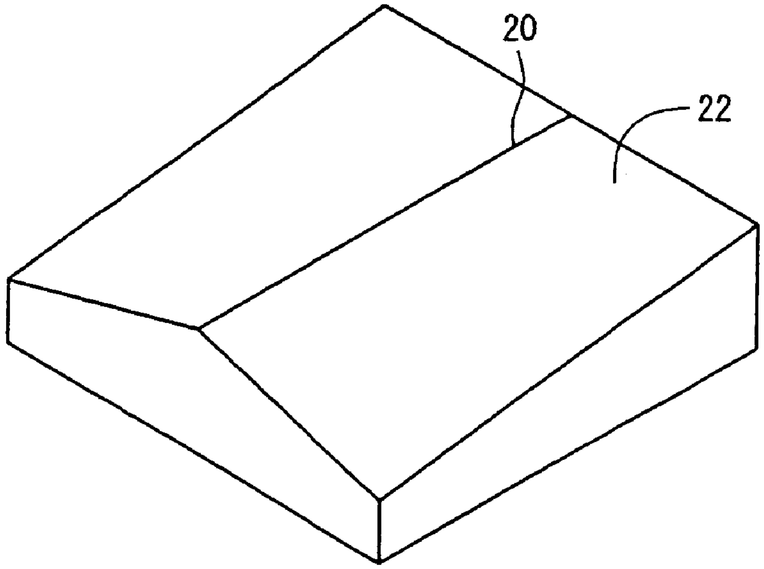

FIGS. 3 and 4 illustrate the shapes of upper surfaces of the manuscript conveyer guide 10 having the partial guide surface 20 illustrated in, for example, FIG. 2*a*. In FIGS. 3 and 4, the upper surfaces of the manuscript conveyer guide 10 are assuming the shape of a mountain (apex is forming the partial guide surface 20, and slope portions are forming non-guide surfaces 22). In FIG. 3, the partial guide surface 20 and the non-guide surfaces 22 are maintaining a predetermined difference in height and in FIG. 4, a difference in the height between the partial guide surface 20 and the non-guide surfaces 22 decreases toward the upper portion, and the two are continuous at the uppermost portion.

Figure 5:
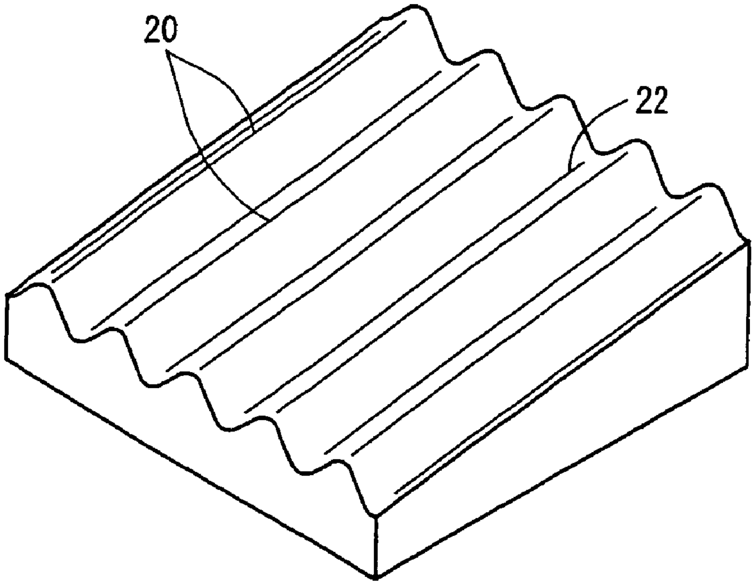
Figure 6:
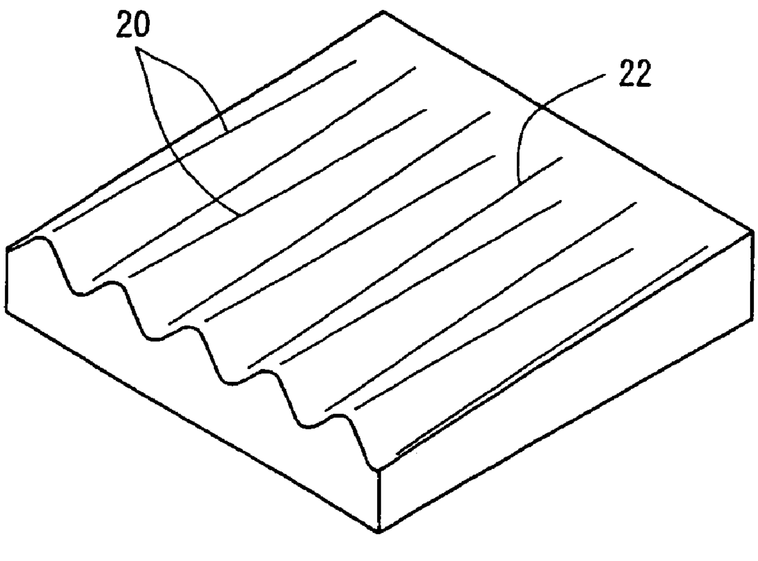

FIGS. 5 and 6 illustrate the shapes of upper surfaces of the manuscript conveyer guide 10 having the partial guide surfaces 20 illustrated in FIG. 2*b*. In FIGS. 5 and 6, the upper surfaces of the manuscript conveyer guide 10 are formed by the repetition of the recessed and protruded surfaces (apexes of the protruded surfaces are the partial guide surfaces 20 and the valley portions are the non-guide surfaces 22). In FIG. 5, the partial guide surfaces 20 and the non-guide surfaces 22 are maintaining a predetermined difference in height and in FIG. 6, a difference in the height between the partial guide surfaces 20 and the non-guide surfaces 22 decreases toward the upper portion, and the they are continuous at the uppermost portion.

Figure 7:
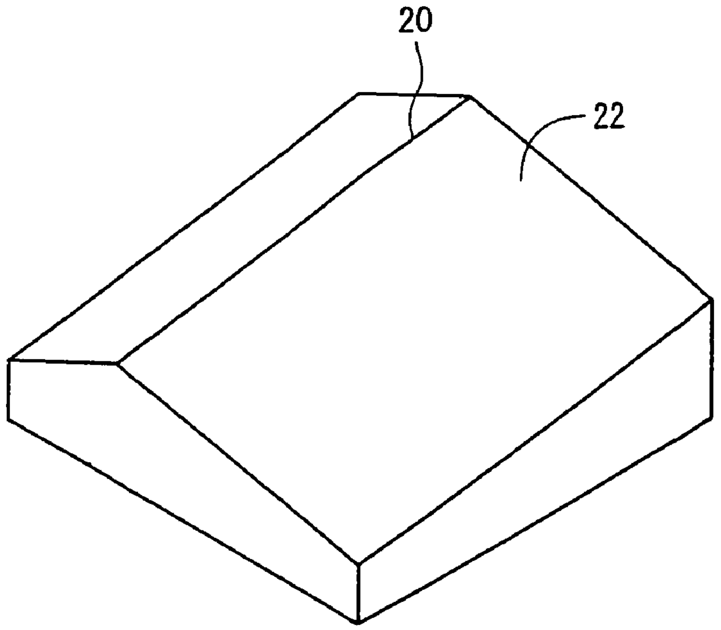
Figure 8:
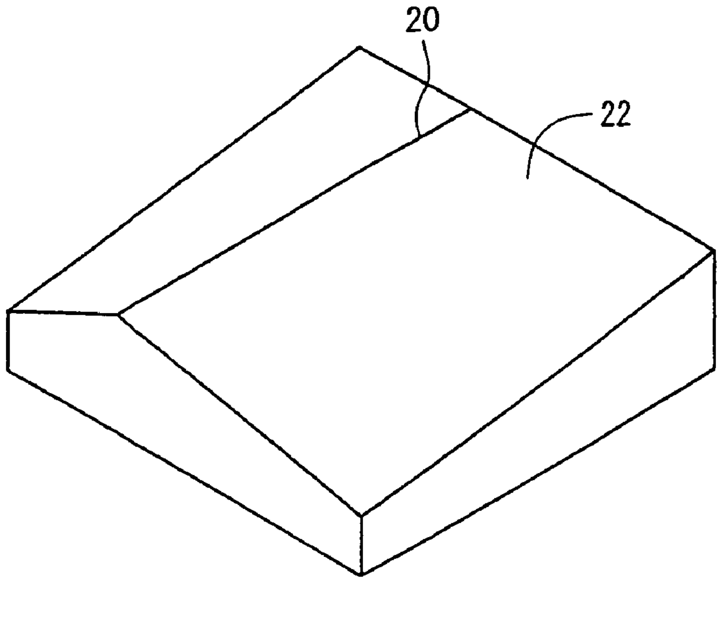

FIGS. 7 and 8 illustrate the shapes of upper surfaces of the manuscript conveyer guide 10 having the partial guide surface 20 illustrated in FIG. 2*c*. In FIGS. 7 and 8, the upper surfaces of the manuscript conveyer guide 10 are formed in the shape of a deviated mountain (apex of the mountain is the partial guide surface 20 and the slope portions are the non-guide surfaces 22). In FIG. 7, the partial guide surface 20 and the non-guide surfaces 22 are maintaining a predetermined difference in height and in FIG. 8, a difference in the height between the partial guide surface 20 and the non-guide surfaces 22 decreases, and they are continuous at the uppermost portion.

According to the present invention as described above, the partial guide surface 20 may be formed at a position where the end of the manuscript 3 comes into contact first with the manuscript conveyer guide 10. In general, however, it is desired that the non-guide surfaces 22 become in flush with the guide surface 20 at the upper portion as illustrated in FIGS. 4, 6 and 8 in order to stably feed the manuscript 3. That is, the structure is desirably such that the manuscript as a whole comes in contact with the upper surface of the manuscript conveyer guide 10 as it goes to the upper side.

The above-mentioned manuscript conveyer guide of the present invention effectively relaxes the shock produced by the end of the manuscript 3 that comes in contact with the guide surface, and effectively prevents the unevenness in the reading of the image caused by the unevenness (uneven speed) in the speed for conveying the manuscript stemming from the shock.

The invention claimed is:

1. A manuscript conveyor guide provided in an image-reading unit that reads an image of a manuscript moving on a contact glass plate by using an optical system arranged under the contact glass plate, the manuscript conveyor guide comprising an upper guide being arranged over the contact glass plate and guiding the manuscript that has passed over the contact glass plate in a direction of discharge, wherein:

said upper guide has a curved surface and a flat surface in a facing portion to an upper surface of the contact glass plate;

the curved surface being positioned on the upstream in the direction which the manuscript is conveyed and the flat surface is positioned on the downstream in the direction which the manuscript is conveyed; and a distance $d_2$ between the flat surface and the contact glass is greater than a distance $d_1$ between the curved surface and the contact glass;

the manuscript being guided downwardly toward the upper surface of the contact glass plate by the curved surface of said upper guide.

2. The manuscript conveyor guide of claim 1 further comprising a downstream guide adjacent to the contact glass plate guiding the manuscript that has passed on the contact glass plate to a discharge tray.

3. The manuscript conveyor guide of claim 2 wherein said downstream guide has an upward incline relative to said contact glass.

4. The manuscript conveyor guide of claim 3 wherein an upstream end of said downstream guide is positioned lower than the upper surface of said contact glass plate.

* * * * *